United States Patent
Nguyen

(10) Patent No.: US 9,631,133 B2
(45) Date of Patent: Apr. 25, 2017

(54) FOAMERS FOR DOWNHOLE INJECTION

(71) Applicant: Nalco Company, Naperville, IL (US)

(72) Inventor: Duy T. Nguyen, Sugar Land, TX (US)

(73) Assignee: Nalco Company, Naperville, IL (US)

(*) Notice: Subject to any disclaimer, the term of this patent is extended or adjusted under 35 U.S.C. 154(b) by 0 days.

(21) Appl. No.: 14/608,845

(22) Filed: Jan. 29, 2015

(65) Prior Publication Data

US 2015/0148268 A1    May 28, 2015

Related U.S. Application Data

(62) Division of application No. 12/565,425, filed on Sep. 23, 2009, now abandoned.

(51) Int. Cl.

| | | |
|---|---|---|
| *C09K 8/58* | (2006.01) | |
| *C09K 8/594* | (2006.01) | |
| *C09K 8/38* | (2006.01) | |
| *C09K 8/518* | (2006.01) | |
| *C09K 8/70* | (2006.01) | |
| *C09K 8/94* | (2006.01) | |

(52) U.S. Cl.
CPC .............. *C09K 8/58* (2013.01); *C09K 8/38* (2013.01); *C09K 8/518* (2013.01); *C09K 8/594* (2013.01); *C09K 8/703* (2013.01); *C09K 8/94* (2013.01); *C09K 2208/32* (2013.01)

(58) Field of Classification Search
None
See application file for complete search history.

(56) References Cited

U.S. PATENT DOCUMENTS

| | | | |
|---|---|---|---|
| 2,731,414 A | | 1/1956 | Binder, Jr. et al. |
| 2,948,685 A | | 8/1960 | Fisher |
| 3,169,113 A | * | 2/1965 | Kirkpatrick et al. ......... 507/240 |
| 3,330,346 A | | 7/1967 | Jacobs et al. |
| 3,479,285 A | | 11/1969 | Barthauer |
| 3,497,007 A | * | 2/1970 | Ayers, Jr. et al. ......... 166/270.1 |
| 3,616,853 A | * | 11/1971 | Ayers, Jr. .................. 166/400 |
| 3,720,498 A | | 3/1973 | Redmore |
| 3,989,632 A | | 11/1976 | Fischer et al. |
| 4,775,489 A | * | 10/1988 | Watkins et al. ................ 507/202 |
| 4,778,589 A | | 10/1988 | Reynolds |
| 4,844,745 A | | 7/1989 | Nash et al. |
| 5,279,367 A | | 1/1994 | Osterloh |
| 5,300,235 A | | 4/1994 | Clewlow et al. |
| 5,459,125 A | * | 10/1995 | Ohlsen et al. ................ 507/129 |
| 5,503,779 A | | 4/1996 | Adamy et al. |
| 5,512,212 A | | 4/1996 | Brown et al. |
| 5,567,675 A | * | 10/1996 | Romocki ...................... 507/131 |
| 5,871,048 A | | 2/1999 | Tokar et al. |
| 6,143,709 A | | 11/2000 | Carey |
| 6,488,868 B1 | | 12/2002 | Meyer |
| 6,630,428 B1 | | 10/2003 | Furman et al. |
| 7,093,658 B2 | | 8/2006 | Chatterji et al. |
| 7,122,509 B2 | | 10/2006 | Sanner et al. |
| 7,497,943 B2 | | 3/2009 | Nguyen et al. |
| 7,971,659 B2 | | 7/2011 | Gatlin et al. |
| 7,992,653 B2 | | 8/2011 | Zamora et al. |
| 2001/0009890 A1 | | 7/2001 | Patel et al. |
| 2004/0110643 A1 | | 6/2004 | Zevallos |
| 2004/0177968 A1 | | 9/2004 | Ramachandran |
| 2005/0014671 A1 | | 1/2005 | Queen |
| 2005/0092489 A1 | | 5/2005 | Welton et al. |
| 2005/0137114 A1 | | 6/2005 | Gatlin et al. |
| 2006/0128990 A1 | | 6/2006 | Davis et al. |
| 2007/0079963 A1 | | 4/2007 | Yang et al. |
| 2008/0200351 A1 | | 8/2008 | Dahanayake et al. |
| 2008/0257554 A1 | * | 10/2008 | Zamora ................... C09K 8/38 166/309 |
| 2009/0131283 A1 | | 5/2009 | Nguyen et al. |

FOREIGN PATENT DOCUMENTS

| | | |
|---|---|---|
| CA | 2 629 177 A1 | 10/2008 |
| EP | 0 631 605 B1 | 4/1999 |
| WO | 02/092963 A1 | 11/2002 |
| WO | 2004/020553 A1 | 3/2004 |

* cited by examiner

*Primary Examiner* — John J Figueroa
(74) *Attorney, Agent, or Firm* — Senniger Powers LLP

(57) ABSTRACT

This invention relates generally to novel foamer compositions for treatment of oil and gas wells to enhance production. The invention provides a method of foaming a fluid. The method includes introducing into the fluid a foam-forming amount of a composition comprising at least one long chain fatty acid and at least one organic solvent. An example of the long chain fatty acid is tall oil fatty acid and an example of the organic solvent is ethyleneglycol monobutyl ether.

8 Claims, No Drawings

US 9,631,133 B2

FOAMERS FOR DOWNHOLE INJECTION

CROSS-REFERENCE TO RELATED APPLICATION

This application is a divisional of U.S. patent application Ser. No. 12/565,425, filed Sep. 23, 2009, the entire content of which is incorporated herein by reference.

TECHNICAL FIELD

This invention relates generally to methods of using novel foamer compositions for treatment of oil and gas wells to enhance production. More specifically, the invention relates to novel foamer compositions having a tall oil fatty acid component and an organic solvent. The invention has particular relevance to foamer compositions having a tall oil fatty acid component and a glycol component.

BACKGROUND OF THE INVENTION

Declining reservoir pressure in natural gas wells may lead to gas production decreases. The typical cause of this decrease is liquid loading that occurs when water and condensate enter the bottom of the well. Foaming agents (sometimes referred to as "foamers") are frequently used to aid in the unloading of water and condensate accumulated in the wellbore, thereby increasing production from a loaded well. Such agents are generally applied either by batch treatments or continuous applications via injecting down a capillary string or via the casing/tubing annulus. Foamers function by reducing the surface tension and fluid density in the wellbore, and may also be used in conjunction with a lift gas to enhance oil recovery from oil wells.

U.S. Pat. App. Pub. No. 2006/0128990 teaches a method of treating a gas well comprising a chloride-free amphoteric surfactant. U.S. Pat. No. 7,122,509 discloses a method of preparing a foamer composition having an anionic surfactant and a neutralizing amine In U.S. Pat. App. Pub. 2005/0137114 an aqueous foaming composition comprising an anionic surfactant, a cationic surfactant, and a zwitterionic compound is disclosed. PCT App. Pub. No. WO 02/092963 and U.S. Pat. App. Pub. No. 2007/0079963 disclose methods for recovering oil from a gas-lifted oil well using a lift gas and a foaming surfactant which consists of nonionic surfactants, anionic surfactants, betaines, and siloxanes.

While such foamers represent a significant contribution to the art of unloading fluids in oil and gas wells, there still remains a need for improved foamers and methods of using improved foamers. It is thus an objective of this invention to provide a cost-effective foamer for unloading oil, water, or mixtures thereof from oil and/or gas wells. Such improved foamers would also ideally be compatible with anti-corrosive and anti-scale agents.

SUMMARY OF THE INVENTION

This invention provides a method of foaming a fluid. In a preferred aspect, the method includes introducing into the fluid a foam-forming amount of a composition comprising at least one long chain fatty acid and at least one organic solvent. In preferential embodiments, the long chain fatty acid is preferably tall oil fatty acid and the organic solvent is preferably ethyleneglycol monobutyl ether.

It is an advantage of the invention to provide novel foaming agents for downhole injection in oil and gas wells.

It is a further advantage of the invention to provide an efficient method of recovering oil from a gas-lifted oil well penetrating a subterranean oil-bearing formation.

Another advantage of the invention is to provide an efficient method to remove hydrocarbon fluids from a gas-producing well.

Additional features and advantages are described herein, and will be apparent from, the following Detailed Description and Examples.

DETAILED DESCRIPTION OF THE INVENTION

The method of using the foaming compositions of this invention have been shown to be effective for recovering natural gas from a gas well and recovering crude oil from a gas-lifted oil well penetrating a subterranean oil-bearing formation. That is, the foaming agents of the present invention effectively remove hydrocarbon and/or water or mixtures thereof from the wells. The effective amount of active ingredient in a formulation required to sufficiently foam varies with the system in which it is used. Methods for monitoring foaming rates in different systems are well known to those skilled in the art and may be used to decide the effective amount of active ingredient required in a particular situation. The described compounds may be used to impart the property of foaming to a composition for use in an oil or gas field application.

The foamers of the invention can be applied by batch treatments or continuous applications via the casing/tubing annulus or via capillary strings and are typically introduced into the downhole end of a well. A batch treatment involves the application of a single volume of foamer to the well, as opposed to a smaller volume applied continuously for the case of a continuous application. The next batch is applied after a period of time when the foamer starts to lose its effectiveness.

The described foaming compositions are particularly effective for unloading fluids (oil and/or water) from oil and gas wells under a variety of conditions. These compounds/compositions may be used in wells in which oil cuts in the field can range from about 0% (oil field) to 100% (refinery) oil, while the nature of the water can range from 0 to 300,000 ppm TDS (total dissolved solids). In addition, the bottom hole temperature can be between 60° F. and 400° F. In a preferred method, the described foamers can be applied by batch treatments or continuously via the casing/tubing annulus or via capillary strings. Batch treatment typically involves the application of a single volume of foamer to the well, where a subsequent batch is applied when the foamer begins to lose its effectiveness. In a typical continuous application, in contrast, a smaller volume is applied continuously.

In an embodiment, a synergistic foaming agent is formed by mixing one or more long chain fatty acids with one or more organic solvents. A preferred composition is prepared by blending by blending a TOFA with EGMBE. According to alternative embodiments of the invention, the organic solvent is present in an amount from about 5 to about 70% by weight of actives based on the total weight of the mixture. Mixtures of TOFA and other long chain fatty acids are used in other embodiments of the invention as well as mixture of EGMBE and other organic solvents. The effectiveness of the foaming agent formulation of this invention can generate stable foams levels from about 10 ppm to about 100,000 ppm of actives. A more preferred range is about 100 ppm to about 20,000 ppm of actives. Most preferably, the range is from about 200 ppm to about 10,000 ppm of actives. Each dosage is based on total volume of fluid.

"Organic solvent" generally refers to one or more organic solvents or a mixture of water and organic solvent(s). Examples of suitable solvents are alcohols such as methanol, ethanol, isopropanol, isobutanol, secondary butanol; glycols such as ethylene glycol, and ethylene glycol monobutyl ether ("EGMBE"), and the like; and aliphatic and aromatic hydrocarbons including heavy aromatic naphtha. The selection of the solvent system may be made empirically based on the characteristics of the system being treated. The preferred organic solvent is EGMBE.

"Long chain fatty acids" refers to fatty acids of the type $R_1CO_2H$. Representative long chain fatty acids include caprylic acid; nonanoic acid; capric acid; undecanoic acid; lauric acid; tridecanoic acid; myristic acid; palmitoleic acid; tall oil fatty acid ("TOFA"), such a mixture of oleic, linoleic and linolenic acids; stearic acid; palmitic acid; arachidic acid; arachidonic acid; oleic acid; 9,11,13-octadecatrienoic acid; 5,8,11,14-eicosatetraenoic acid; eicosenoic acid; heneicosenoic acid; erucic acid; heneicosanoic acid; behenic acid; 3-methylhexadecanoic acid; 7-methylhexadecanoic acid; 13-methylhexadecanoic acid; 14-methyl-11-eicosenoic acid; the like; and mixtures thereof.

The preferred long chain fatty acid is TOFA, which in an embodiment refers to a distilled product derived from trees and which consists of a mixture of fatty acids, $C_{17}H_{31\text{-}35}$COOH with a CAS No. 61790-12-3. It is a mixture of oleic acid as a major component, linoleic acid and saturated fatty acids. For purposes of this invention the radical obtained therefrom will be identified as heptadecenyl. In another embodiment, TOFA refers to tall oil fatty acid stock and typically includes about 1% palmitic acid; about 2% stearic acid; about 48% oleic acid; about 35% linoleic acid; about 7% conjugated linoleic acid $(CH_3(CH_2)_xCH=CHCH=CH(CH_2)_yCOOH$, where x is generally 4 or 5, y is usually 7 or 8, and X+Y is 12); about 4% other acids, such as 5,9,12-octadecatrienoic acid, linolenic acid, 5,11,14-eicosatrenoic acid, cis,cis-5,9-octadecadienoic acid, eicosadienoic acid, elaidic acid, cis-11 octadecanoic acid, and C-20, C-22, C-24 saturated acids; and about 2% unsaponifiable matter. In other embodiments, TOFA includes any suitable tall oil fatty acid or mixture known in the art or equivalents thereof.

It should be appreciated that the described compounds may be used alone or in combination with other compounds to further increase the effect and delivery of the products. Typical combinations include pour point depressants and/or surfactants. Examples of suitable pour point depressants are $C_1$ to $C_3$ linear or branched alcohols, ethylene, and propylene glycol. Examples of suitable surfactants are nonionic surfactants, such as alkoxylated alcohols, carboxylic acids or ethers, alkyl ethoxylates, and sorbitan derivatives; anionic surfactants, such as fatty carboxylates, alkyl phosphates, alkyl sulfonates, and alkyl sulfates; cationic surfactants, such as mono- and di-alkyl quaternary amines; amphoteric surfactants, such as alkyl betaines, alkylamido propyl betaines, alklyampho acetates, and alkylamidopropyl hydroxysultaines. Moreover, the described foamers may also be used in conjunction with other foamers, such as those disclosed in U.S. patent application Ser. No. 11/940,777, "Imidazoline-Based Heterocyclic Foamers for Downhole Injection" and any other suitable foamers.

The described foamers or foaming agents of this invention have been shown to be effective for penetrating subterranean oil-bearing or gas-bearing formations to recover natural gas from a gas well or recover crude oil from a gas-lifted oil well. Exemplary gas-lift methods for producing oil are disclosed in U.S. Pat. No. 5,871,048 and U.S. Patent Application No. 2004-0177968 A1. In other words, the foaming agents of the invention are effective at aiding and making more efficient removal of hydrocarbon and/or water or mixtures thereof from wells. It should be appreciated that in some embodiments other corrosion inhibitors, scale inhibitors, and/or biocides may be used in conjunction with or in formulations including the foamers of this invention.

Representative corrosion inhibitors include amidoamines, quaternary amines, amides, phosphate esters, other suitable corrosion inhibitors, and combinations thereof. Representative scale inhibitors include polyphosphates, polyphosphonates, other suitable scale inhibitors, and combinatios thereof. Exemplary corrosion inhibitors are disclosed in U.S. patent application Ser. No. 11/763,006, "Mono and Bis-Ester Derivatives of Pyridinium and Quinolinium Compounds as Environmentally Friendly Corrosion Inhibitors" or any other suitable corrosion inhibitor. The composition may also include one or more suitable solvents including, but not limited to water, monoethylene glycol, ethylene glycol, ethylene glycol monobutyl ether, methanol, isopropanol, the like, derivatives thereof, and combinations thereof.

Even though this disclosure is directed primarily to oil and gas recovery applications, it is contemplated that the composition of the invention may also be used in other applications. For example, the composition may be used as a deposit control agent or cleaner to remove deposits (e.g., hydrocarbonaceous deposits) from wells and/or pipelines. "Hydrocarbonaceous deposit" refers generally to any deposit including at least one hydrocarbon constituent and forming on the inner surface of flowlines, pipelines, injection lines, wellbore surfaces, storage tanks, process equipment, vessels, the like, and other components in oil and gas applications. Such deposits also include "schmoo," which refers to a solid, paste-like, or sludge-like substance that adheres to almost any surface with which it comes in contact and is particularly difficult to remove. Deposits contributing to schmoo may include, for example, sand, clays, sulfur, naphthenic acid salts, corrosion byproducts, biomass, and other hydrocarbonaceous materials bound together with oil. The compositions of this invention may be used in conjunction with other deposit control agents, such as those disclosed in U.S. patent application Ser. No. 11/952,211, "Environmentally Friendly Bis-Quaternary Compounds for Inhibiting Corrosion and Removing Hydrocarbonaceous Deposits in Oil and Gas Applications."

EXAMPLE

The foregoing may be better understood by reference to the following example, which is intended for illustrative purposes and is not intended to limit the scope of the invention.

This example illustrates the effectiveness of the foamer composition of the invention. In a preferred method of preparation, the foaming composition of the invention was prepared by mixing 70 grams of TOFA with 5% rosin with 30 grams of EGMBE at room temperature. A homogeneous solution was observed. The product was identified as Product 1. TOFA with 5% rosin in the absence of EGMBE was identified as Product 2. TOFA containing 1% rosin and zero EGMBE was identified as Product 3.

The table below displays the results when a foaming agent was added to a mixture of hydrocarbon condensate received from the field and brine (10.2% NaCl and 3.7% $CaCl_2.2H_2O$) in a ratio of 9 to 1, respectively. The condensate-to-brine ratios were 90/10 (vol/vol) for all tests. Cocoamidopropyl betaine (C. Betaine in the table below), a conventional foaming agent, was also tested as a control. The test cell included a nitrogen supply; a jacketed 1,000 ml graduated cylinder with a glass frit on the bottom for gas flow; a flow meter; a temperature-controlled water bath; a container for collecting unloaded liquid; a condenser for transporting the liquid from a cylinder to another container; and a balance connected to a computer for recording real-time measurements. The gas flow rate was held constant at 15 SCFH.

The weight percent liquid unloading was calculated by dividing the weight of the collected liquid in the container at 5 min (i.e., the amount overflowed) by the initial weight placed in the cylinder times 100. The weight percent of the liquid removed (i.e., percent unloading) was then calculated from 100 grams of fluid. It can be seen that Products 1, 2, and 3 of the present invention are superior to the conventional foamer. It can also be seen that addition of EGMBE increases the liquid unloading efficiency (Product 1 vs. Product 2).

| Product | Foamer Actives | Percent Unloading |
|---|---|---|
| C. Betaine | 1% | 0 |
| Product 1 | 7,000 ppm | 62 |
| Product 2 | 1% | 45 |
| Product 3 | 1% | 35 |

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein and parent or continuation patents or patent applications, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of recovering natural gas or crude oil from a well, the method comprising: introducing into a fluid at a downhole end of an oil well or a gas well a foam-forming amount of a composition comprising a homogeneous solution of at least one tall oil fatty acid and at least one organic solvent comprising ethyleneglycol monobutyl ether, wherein the homogeneous solution consists of from about 5% to 70% of the organic solvent and a remainder of the homogeneous solution being the tall oil fatty acid, and the fluid comprises a hydrocarbon, water or a mixture thereof.

2. The method of claim 1, further comprising introducing into the fluid the foam-forming amount of the foaming composition to the downhole end of the well as a batch addition.

3. The method of claim 1, further comprising continuously introducing into the fluid the foam-forming amount of the foaming composition to the downhole end of the well.

4. The method of claim 1, wherein the fluid is oil or gas, and water.

5. The method of claim 1, wherein the homogeneous solution consists of from about 30% to about 70% of the organic solvent and the remainder of the homogeneous solution being the tall oil fatty acid.

6. The method of claim 1, wherein the long chain fatty acid is dispersed or dissolved in the organic solvent.

7. The method of claim 1, wherein the homogeneous solution consists of about 5 to about 30% by weight of the organic solvent and the remainder of the homogenous solution being the tall oil fatty acid.

8. A method of recovering natural gas or crude oil from a well, the method consisting of: introducing into a fluid at a downhole end of an oil well or a gas well a foam-forming amount of a composition consisting of a solution of at least one tall oil fatty acid and at least one organic solvent comprising ethylene glycol monobutyl ether, and the fluid comprises a hydrocarbon, water or a mixture thereof.

* * * * *